Patented Dec. 7, 1943

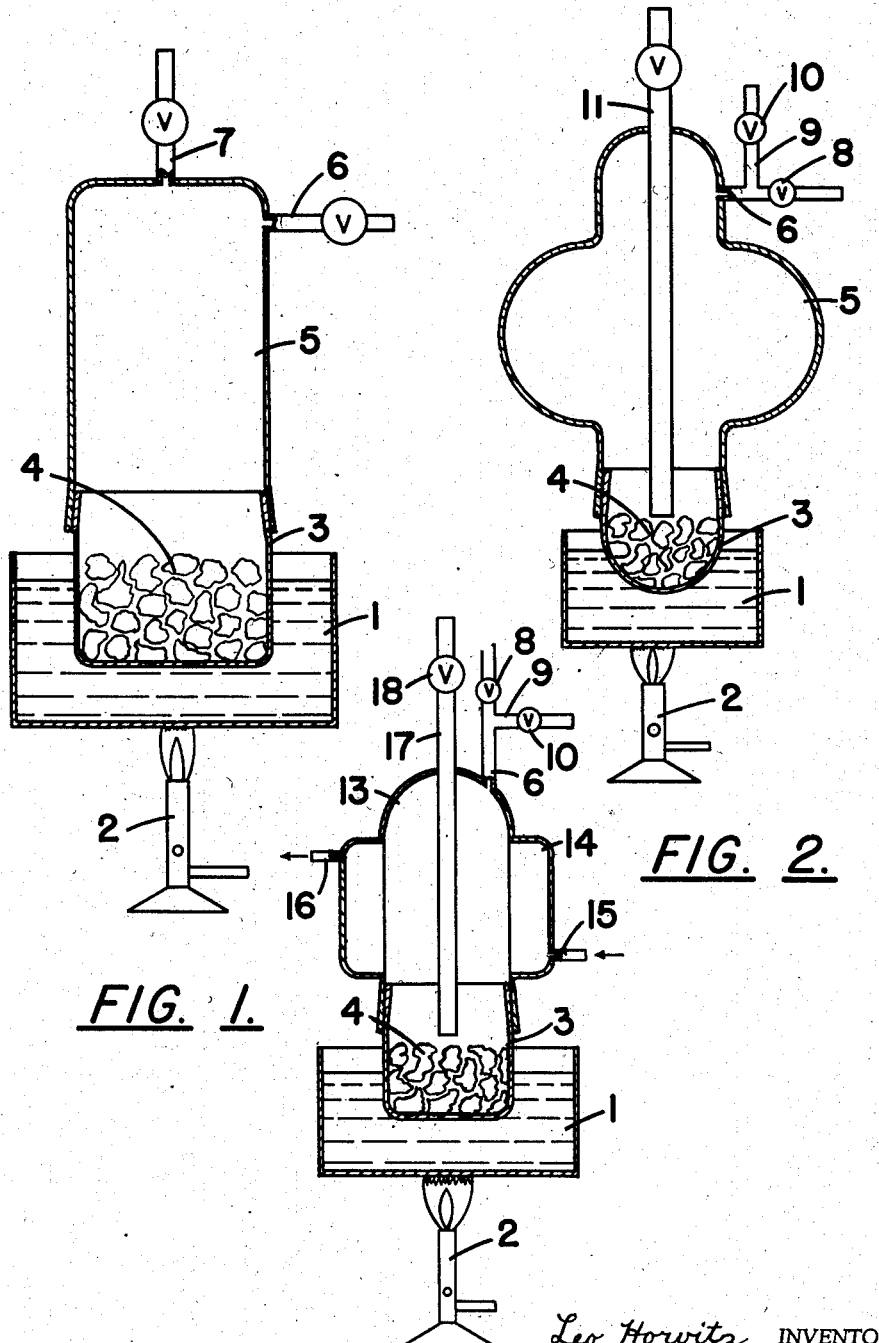

2,336,176

UNITED STATES PATENT OFFICE 2,336,176

GEOCHEMICAL PROSPECTING

Leo Horvitz, Houston, Tex., assignor to Esme E. Rosaire, Houston, Tex.

Application December 9, 1940, Serial No. 369,213

3 Claims. (Cl. 23—230)

The present invention is directed to geochemical prospecting, and particularly to that method of prospecting according to which soil samples are collected and subjected to a treatment for the recovery therefrom of a gas which is analyzed for the constituents significant of subterranean petroliferous deposits.

This application is a continuation in part of my copending application Serial No. 183,960, filed January 8, 1938, now Patent 2,287,101, issued June 23, 1942, insofar as it is directed to a method for recovering a gas sample from a soil sample by heating the soil sample in a closed space under conditions such that water is distilled off of the soil sample and subjecting the evolved vapors to a reflux action whereby water is continuously returned to the soil sample. This procedure, insuring, as it does, the continuous presence of water in the soil sample, makes possible the recovery of a larger sample of gas containing significant constituents because the water in coming off from the soil sample apparently facilitates the removal of adsorbed hydrocarbons from the soil particles.

The present invention will be better understood by reading the detailed description of the accompanying drawing in which Fig. 1 represents in diagrammatic form a front elevation of one type of apparatus suitable for the practice of the present invention;

Fig. 2 is a similar view of a modified form of apparatus;

Fig. 3 is a similar view of still another modification.

Referring to Fig. 1 in detail, numeral 1 designates a water or oil bath under which is placed a conventional burner 2. Arranged in the heating bath is a jar 3 in which is placed the soil sample 4. The mouth of the jar has a ground surface adapted to mate with a similar ground surface of a jar 5 arranged over jar 3 in inverted position. Jar 5 has an outlet 6 for gas which it is desired to discard from the system and a second outlet 7 for conducting the desired gas sample to a collection vessel or an analytical apparatus. A suitable vacuum pump is ordinarily connected to the outlet 6 for reducing the pressure inside the space defined by jars 3 and 5 and for withdrawing undesired gas.

In the practice of the invention the soil sample is placed in the jar 3, and jar 5 is arranged in the position shown. The valve in line 7 is closed, the valve in line 6 is opened and suction applied. Gas given off at this stage is discarded from the system. When the pressure is reduced sufficiently, which ordinarily is about 100 mm., the valve in line 6 is closed and heat is applied to the bath 1. The valve in line 7 is opened and the evolved gas is allowed to expand to a collection chamber (not shown) or is sent directly to an analytical apparatus. The volume of jar 5 is large compared to that of jar 3, or is at least as large as jar 3. This provides a large exposed surface which ordinarily will remain at a temperature not substantially above room temperature, whereby any moisture contained in the evolved gas will collect on the walls of jar 5 and will return to jar 3.

The gas sample which is collected through line 7 is usually treated for the removal therefrom of water and $CO_2$ and is then analyzed for significant constituents such as hydrocarbons, hydrogen, or carbon monoxide.

The apparatus shown in Fig. 2 differs from that shown in Fig. 1 in that it is provided with an inlet for a treating chemical, such as an acid, which may be used to facilitate the separation of gas from the soil. In this case the upper jar 5 is provided with a gas outlet 6 having a valve 8 and ahead of this valve having a branch line 9 provided with a valve 10. Line 6, as in the case of Fig. 1, is connected with a suitable source of vacuum, and line 9 is connected to a gas collecting chamber or the gas analytical apparatus.

Fused into the top of chamber 5 and extending downwardly therein is a tube 11. This tube is of sufficient length to extend down into the jar 3 so that treating chemicals can be dropped directly into the soil. It should be noted also that in this embodiment the shape of vessel 5 is changed so as to provide more wall surface.

In the embodiment shown in Fig. 3, the jar 5 is replaced by a conventional reflux condenser having an inner tube 13 provided with a jacket 14 which has a water inlet 15 and a water outlet 16. At the upper end of tube 13 is the gas outlet 6 which is the same as that shown in Fig. 2. It is provided with a branch line 9, as in Fig. 2. Arranged concentrically in the tube 13 is an inner tube 17 provided with a valve 18. This tube, as in the case of Fig. 2, is of sufficient length to extend down in vessel 3 so as to permit the addition of chemicals to the soil in this vessel.

It will be apparent that changes may be made in the apparatus shown without departing from the scope of the present invention. The essential feature is that means is provided above the sample chamber containing the soil sample for condensing water out of evolved gas so that this water may be returned to the soil sample.

The nature and objects of the present invention having been thus described and illustrated, what is claimed as new and useful and is desired to be secured by Letters Patent is:

1. A method for treating a soil sample containing entrained or adsorbed normally gaseous hydrocarbons in conjunction with water for the recovery therefrom of a hydrocarbon-containing gas sample for analysis which comprises confining the soil sample in a closed system, subjecting the sample to evacuation and heating whereby entrained gases and moisture contained therein are evolved, condensing a substantial portion of the moisture contained in the evolved gas to thereby leave a residual gas for analysis which is drawn off from said system, and returning the condensate to the sample.

2. A method for treating a soil sample containing entrained or adsorbed normally gaseous hydrocarbons in conjunction with water for the recovery therefrom of a hydrocarbon containing gas sample for analysis which comprises confining the soil sample in a closed system, subjecting the sample to evacuation and heating whereby entrained gases and moisture contained therein are evolved, condensing a substantial portion of the moisture contained in the evolved gases and returning the condensate to the sample and subjecting the residual evolved gas to a treatment for the removal therefrom of carbon dioxide and any remaining water, thereby placing the residual gas in a condition suitable for analysis thereof for hydrocarbons.

3. A method for treating a soil sample containing entrained and adsorbed normally gaseous hydrocarbons in conjunction with water for the recovery therefrom of a hydrocarbon containing gas sample for analysis which comprises confining the sample in a closed system, subjecting the sample to a pressure substantially below atmospheric for a period of time sufficient to remove interstitial gas from the sample, discarding said gas from the system, then subjecting the sample to heat while maintaining subatmospheric pressure to evolve a further quantity of gas therefrom including normally gaseou hydrocarbons and water vapor, condensing a substantial portion of the water vapor from the gas and returning the condensate to the sample, collecting the residual gas and treating it for the removal therefrom of carbon dioxide and any remaining water vapor whereby the gas is placed in condition for analysis thereof for hydrocarbons.

LEO HORVITZ.